United States Patent
Al-Imari et al.

(10) Patent No.: US 10,750,482 B2
(45) Date of Patent: Aug. 18, 2020

(54) UPLINK CONTROL CHANNEL DESIGN FOR HIGH RELIABILITY TRANSMISSION IN MOBILE COMMUNICATIONS

(71) Applicant: MediaTek Singapore Pte. Ltd., Singapore (SG)

(72) Inventors: Mohammed S Aleabe Al-Imari, Cambridge (GB); Abdelkader Medles, Cambridge (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 35 days.

(21) Appl. No.: 16/045,701

(22) Filed: Jul. 25, 2018

(65) Prior Publication Data
US 2019/0053217 A1 Feb. 14, 2019

Related U.S. Application Data

(60) Provisional application No. 62/544,068, filed on Aug. 11, 2017.

(51) Int. Cl.
*H04W 72/04* (2009.01)
*H04L 1/16* (2006.01)
(Continued)

(52) U.S. Cl.
CPC ...... *H04W 72/0413* (2013.01); *H04B 7/0413* (2013.01); *H04L 1/0073* (2013.01);
(Continued)

(58) Field of Classification Search
CPC ......... H04W 72/0413; H04W 72/0473; H04W 76/28; H04L 5/0055; H04L 1/1858;
(Continued)

(56) References Cited

U.S. PATENT DOCUMENTS

| 2003/0232622 A1* | 12/2003 | Seo ........................ H04W 52/16 455/437 |
| 2008/0194283 A1* | 8/2008 | Chaponniere ....... H04W 52/286 455/522 |
| 2008/0287155 A1* | 11/2008 | Xu ........................ H04L 5/0055 455/522 |
| 2009/0207793 A1* | 8/2009 | Shen ..................... H04L 1/1858 370/329 |

(Continued)

FOREIGN PATENT DOCUMENTS

| CN | 1455607 A | 11/2003 |
| CN | 102550074 A | 7/2012 |

OTHER PUBLICATIONS

Taiwan Intellectual Property Office, Office Action for Taiwan Patent Application No. 107127439, dated Jul. 16, 2019.

*Primary Examiner* — Ajit Patel
*Assistant Examiner* — Wilfred Thomas
(74) *Attorney, Agent, or Firm* — Han IP PLLC; Andy M. Han

(57) ABSTRACT

Various solutions for uplink control channel design for high reliability transmission with respect to user equipment and network apparatus in mobile communications are described. An apparatus may receive a downlink signal from a network node. The apparatus may determine a first configuration to transmit an acknowledgement (ACK). The apparatus may determine a second configuration to transmit a negative acknowledgement (NACK). The apparatus may transmit the NACK to the network node in response to unsuccessful detection of the downlink signal. The second configuration may be different from the first configuration.

18 Claims, 6 Drawing Sheets

(51) Int. Cl.
   *H04L 5/00* (2006.01)
   *H04L 1/18* (2006.01)
   *H04L 1/00* (2006.01)
   *H04B 7/0413* (2017.01)
   *H04L 1/12* (2006.01)
   *H04L 1/08* (2006.01)
   *H04W 76/28* (2018.01)

(52) U.S. Cl.
   CPC .......... *H04L 1/1692* (2013.01); *H04L 1/1858* (2013.01); *H04L 5/0053* (2013.01); *H04L 5/0055* (2013.01); *H04W 72/0473* (2013.01); *H04W 76/28* (2018.02); *H04L 1/08* (2013.01); *H04L 5/0023* (2013.01); *H04L 2001/125* (2013.01)

(58) Field of Classification Search
   CPC ... H04L 1/1692; H04L 1/0073; H04L 5/0053; H04L 2001/125; H04L 5/0023; H04L 1/08; H04B 7/0413
   See application file for complete search history.

(56) References Cited

U.S. PATENT DOCUMENTS

| | | | |
|---|---|---|---|
| 2012/0020241 A1* | 1/2012 | Nguyen | H04L 1/1692 370/252 |
| 2012/0207054 A1* | 8/2012 | Okubo | H04L 1/0003 370/252 |
| 2013/0094468 A1* | 4/2013 | Ko | H04B 7/0404 370/329 |
| 2013/0148617 A1* | 6/2013 | Park | H04L 1/1861 370/329 |
| 2013/0322372 A1* | 12/2013 | Kim | H04W 16/14 370/329 |
| 2014/0185553 A1* | 7/2014 | Suzuki | H04L 1/1858 370/329 |
| 2015/0049690 A1* | 2/2015 | Sambhwani | H04L 1/0053 370/329 |
| 2015/0078273 A1* | 3/2015 | Aiba | H04L 5/0048 370/329 |
| 2019/0037410 A1* | 1/2019 | Yan | H04L 5/0053 |
| 2019/0052439 A1* | 2/2019 | Seo | H04W 72/0473 |

* cited by examiner

UPLINK CONTROL CHANNEL DESIGN FOR HIGH RELIABILITY TRANSMISSION IN MOBILE COMMUNICATIONS

CROSS REFERENCE TO RELATED PATENT APPLICATION(S)

The present disclosure is part of a non-provisional application claiming the priority benefit of U.S. Patent Application No. 62/544,068, filed on 11 Aug. 2017, the content of which is incorporated by reference in its entirety.

TECHNICAL FIELD

The present disclosure is generally related to mobile communications and, more particularly, to uplink control channel design for high reliability transmission with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), ultra-reliable and low latency communications (URLLC) is supported for emerging applications that demands high requirements on end-to-end latency and reliability. A general URLLC reliability requirement for one transmission of a packet is $1\text{-}10^{-5}$ for 32 bytes with a user plane latency of 1 ms. For URLLC, the target for user plane latency should be 0.5 ms for uplink and 0.5 ms for downlink.

In downlink transmission, the user equipment (UE) may need to transmit a feedback indication (e.g., acknowledgement (ACK) or negative acknowledgement (NACK)) to indicate whether a downlink signal is successfully received or not. The network apparatus may have to re-transmit the downlink signal if an NACK is received from the UE. However, the network may misinterpret the feedback indication due to interferences or propagation errors. For example, the network apparatus may misinterpret the NACK as the ACK. This may impact the downlink reliability since the network apparatus may not re-transmit the downlink signal to UE. The UE may have no chances to receive the missed downlink signal.

Accordingly, how to avoid misinterpretation for the feedback indications may be important for downlink transmission. In order to facilitate downlink reliability, it is needed to provide proper mechanisms and coordination for transmitting the ACK and the NACK signals.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to uplink control channel design for high reliability transmission with respect to user equipment and network apparatus in mobile communications.

In one aspect, a method may involve an apparatus receiving a downlink signal from a network node. The method may also involve the apparatus determining a first configuration to transmit an ACK. The method may further involve the apparatus determining a second configuration to transmit a NACK. The method may further involve the apparatus transmitting the NACK to the network node in response to unsuccessful detection of the downlink signal. The second configuration may be different from the first configuration.

In one aspect, an apparatus may comprise a transceiver capable of wirelessly communicating with a plurality of nodes of a wireless network. The apparatus may also comprise a processor communicatively coupled to the transceiver. The processor may be capable of receiving a downlink signal from a network node. The processor may also be capable of determining a first configuration to transmit an ACK. The processor may further be capable of determining a second configuration to transmit a NACK. The processor may further be capable of transmitting the NACK to the network node in response to unsuccessful detection of the downlink signal. The second configuration may be different from the first configuration.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to uplink control channel design for high reliability transmission with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, ultra-reliable and low latency communications (URLLC) is supported for emerging applications that demands high requirements on end-to-end latency and reliability. A general URLLC reliability requirement for one transmission of a packet is $1-10^{-5}$ for 32 bytes with a user plane latency of 1 ms. For URLLC, the target for user plane latency should be 0.5 ms for uplink and 0.5 ms for downlink.

Figure 1:
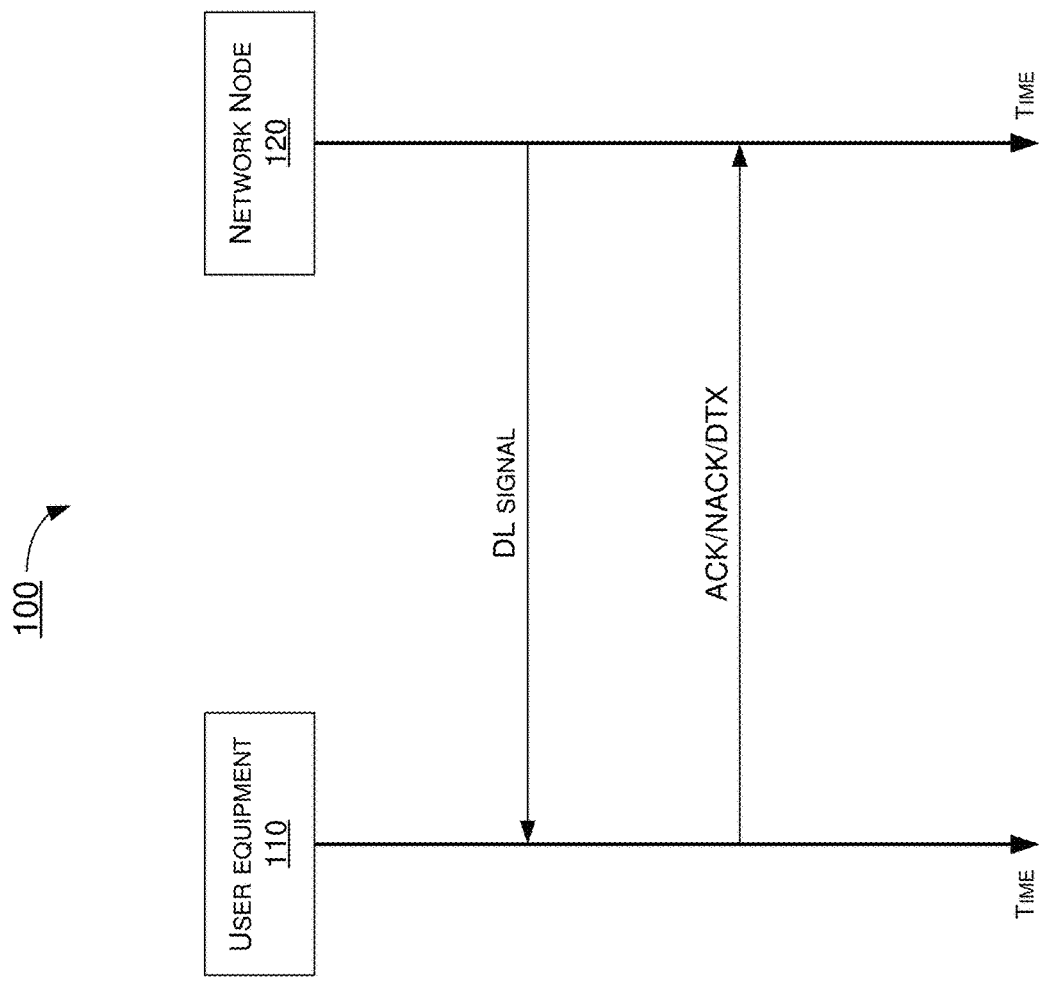
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE 110 and a network node 120, which may be a part of a wireless communication network (e.g., an LTE network, an LTE-Advanced network, an LTE-Advanced Pro network, a 5G network, an NR network, an IoT network or an NB-IoT network). Network node may be configured to transmit a downlink (DL) signal to UE 110. The downlink signal may comprise at least one of a downlink control signal and a downlink data signal (e.g., either or both of the downlink control signal and the downlink data signal). The downlink control signal may be transmitted on a physical downlink control channel (PDCCH). The downlink data signal may be transmitted on a physical downlink shared channel (PDSCH).

On the reception of the downlink signal, some possible scenarios may happen at the UE side. UE 110 may be configured to transmit an acknowledgement (ACK), a negative acknowledgement (NACK), or discontinuous transmission (DTX) in response to the downlink signal. Specifically, in a case that the PDCCH is not detected by UE 110, UE 110 may not transmit any feedback (i.e., DTX) to network node 120. At the network side, network node 120 may re-transmit the downlink signal accordingly. Alternatively, network node 120 may receive an ACK due to DTX-to-ACK error. Network node 120 may misinterpret the DTX as the ACK. This may impact the downlink reliability since network node 120 may not re-transmit the downlink signal missed by UE 110. Alternatively, network node 120 may receive a NACK due to DTX-to-NACK error. Network node 120 may misinterpret the DTX as the NACK. This may trigger the re-transmission at network node 120, but may not impact the downlink reliability.

In a case that the PDCCH is detected, but the data signal on the PDSCH is not detected by UE 110, UE 110 may be configured to transmit a NACK to network node 120. At the network side, network node 120 may receive the NACK, and may re-transmit the downlink signal accordingly. Alternatively, network node 120 may receive an ACK due to NACK-to-ACK error. Network node 120 may misinterpret the NACK as the ACK. This may impact the downlink reliability since network node 120 may not re-transmit the downlink signal to UE 110. Alternatively, network node 120 may receive the DTX due to NACK-to-DTX error. Network node 120 may misinterpret the NACK as the DTX. This may trigger the re-transmission at network node 120, but may not impact the downlink reliability.

In a case that both the PDCCH and the PDSCH are detected by UE 110, UE 110 may be configured to transmit an ACK to network node 120. At the network side, network node 120 may receive the ACK, and the downlink transmission may be finished. Alternatively, network node 120 may receive an NACK due to ACK-to-NACK error. Network node 120 may misinterpret the ACK as the NACK. This may trigger the unnecessary re-transmission at network node 120, but may not impact the downlink reliability. Alternatively, network node 120 may receive the DTX due to ACK-to-DTX error. Network node 120 may misinterpret the ACK as the DTX. This may trigger the unnecessary re-transmission at network node 120, but may not impact the downlink reliability.

Accordingly, false ACK events (e.g., NACK-to-ACK error or DTX-to-ACK error) may degrade the downlink transmission reliability. Other errors may only lead to unnecessary re-transmission, and may have no impact on the downlink transmission reliability. Thus, in order to achieve the URLLC reliability and latency requirements, the probability of the false ACK should be reduced. The DTX-to-ACK error rate may be reduced by improvement at the receiver side. However, the NACK-to-ACK error rate should be reduced by improvement at the transmitter side. How to reduce the NACK-to-ACK error rate at the transmitter side in accordance with implementations of the present disclosure will be described in the following paragraphs. The present disclosure illustrates a plurality of schemes to transmit the ACK and the NACK on the physical uplink control channel (PUCCH) by asymmetric transmissions.

Figure 2:
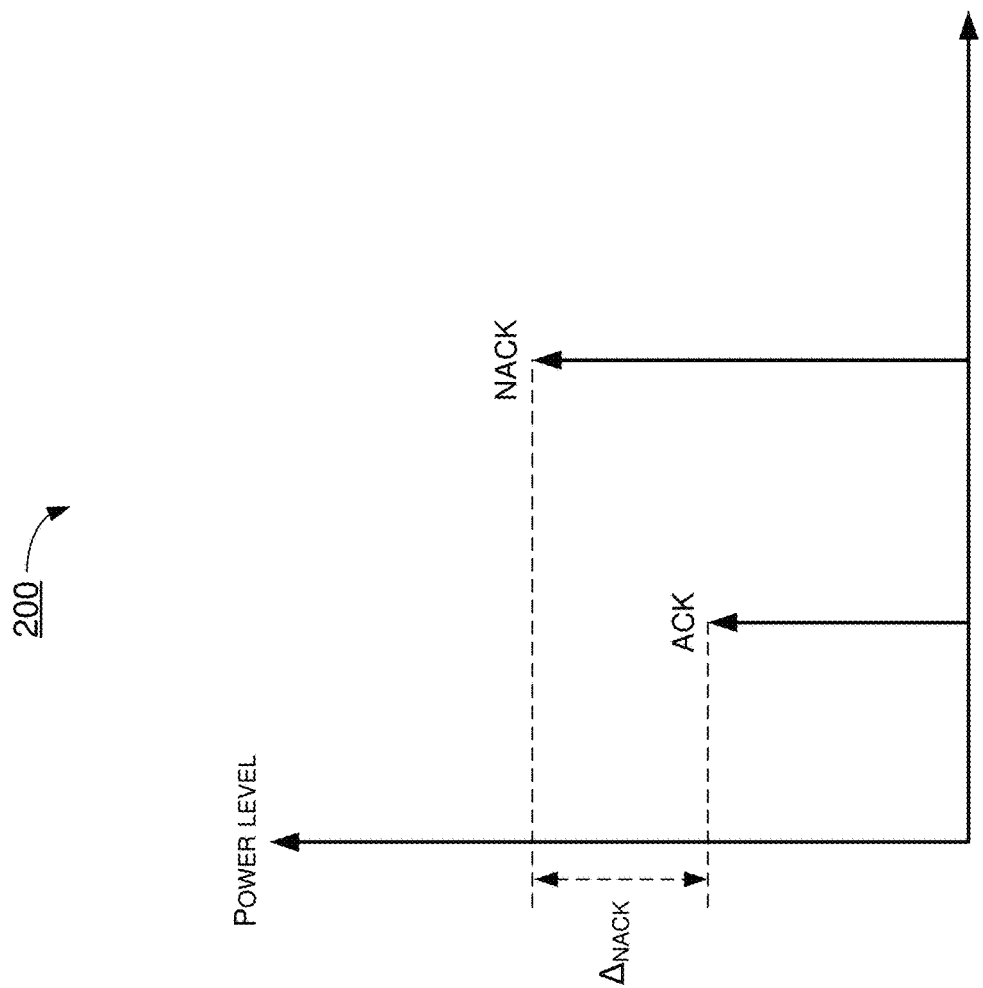
FIG. 2 is a diagram depicting an example scheme under schemes in accordance with implementations of the present disclosure.

FIG. 2 illustrates an example scheme 200 under schemes in accordance with implementations of the present disclosure. Scheme 200 involves a UE and a network node, which may be a part of a wireless communication network (e.g., an LTE network, an LTE-Advanced network, an LTE-Advanced Pro network, a 5G network, an NR network, an IoT network or an NB-IoT network). The network node may transmit a downlink signal to the UE. The UE may be configured to determine a first configuration to transmit an ACK in response to successful detection of the downlink signal. The UE may be configured to determine a second configuration to transmit a NACK in response to unsuccessful detection of the downlink signal. The UE may use different configurations to transmit the ACK and the NACK respectively (i.e., asymmetric ACK and NACK transmission) on the PUCCH. The different configurations may comprise different transmission power levels.

Specifically, the UE may be configured to use a first transmission power level to transmit the ACK (e.g., $P_{PUCCH}^{ACK}$). The UE may be configured to use a second transmission power level to transmit the NACK (e.g., $P_{PUCCH}^{NACK}$). In order to enhance the NACK-to-ACK probability, the second transmission power level may be set to be greater than the first transmission power level (e.g., $P_{PUCCH}^{NACK} > P_{PUCCH}^{ACK}$). For example, the second transmission power level may be determined by increasing an offset power value (e.g., $\Delta_{NACK}$ dB) to the first transmission power level. The UE may further consider the maximum allowable transmission power level on the uplink channel (e.g., $P_{CMAX}$). Accordingly, the UE may be configured to determine the final transmission power level for the NACK according to the following equation.

$$P_{PUCCH}^{NACK} = \min\{P_{CMAX}, P_{PUCCH_{ACK}} + \Delta_{NACK}\}$$

The offset power value (e.g., $\Delta_{NACK}$) may be pre-configured and/or dynamically configured by higher layer of the UE. Alternatively, the offset power value may also be pre-configured and/or dynamically configured by the network node according to UE's power headroom report. Accordingly, the UE may be able to transmit the NACK with a higher power level. This may help the network node to differentiate the NACK from the ACK, and may reduce the NACK-to-ACK error rate.

Figure 3:
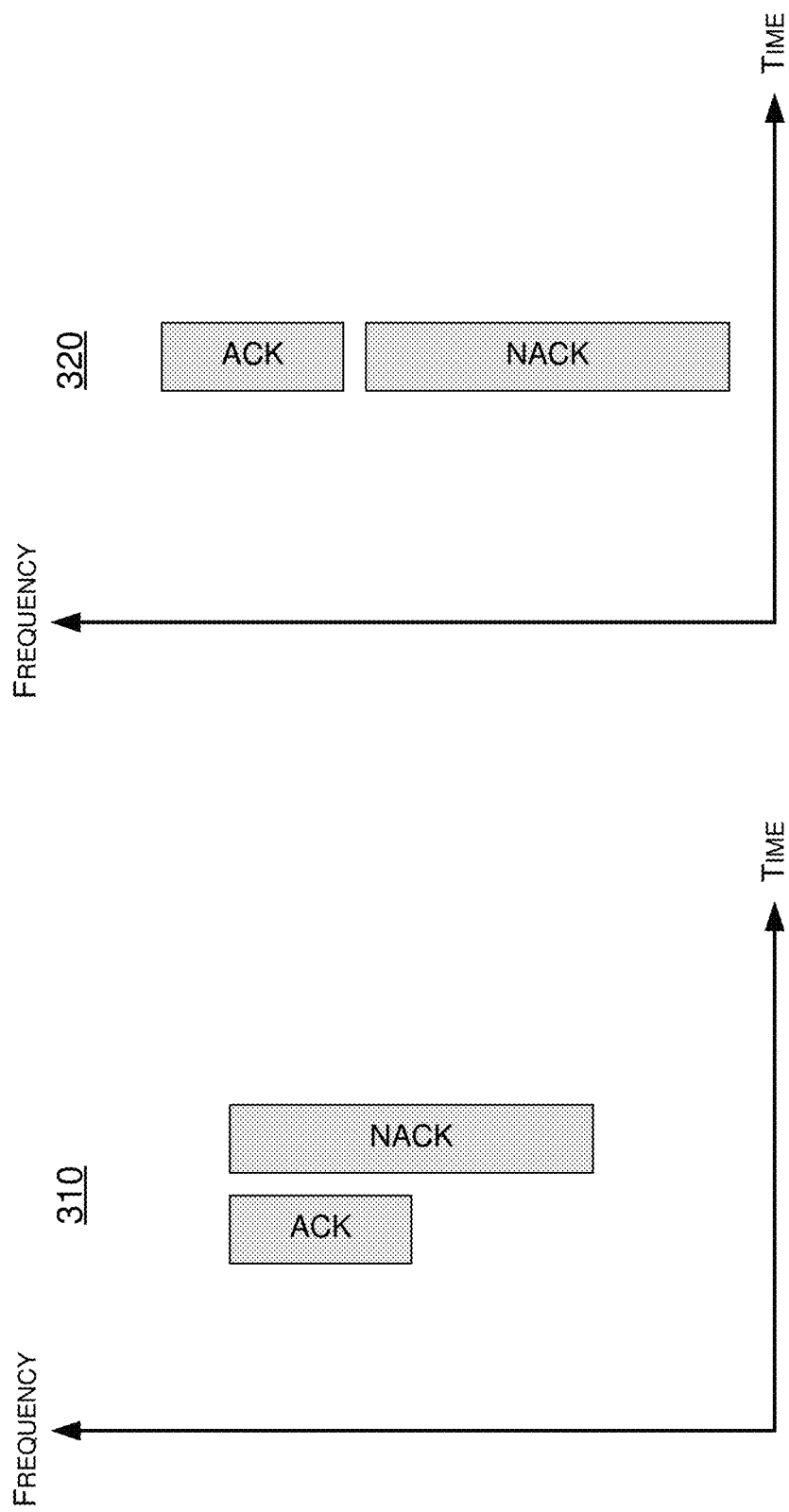
FIG. 3 is a diagram depicting an example scheme under schemes in accordance with implementations of the present disclosure.

FIG. 3 illustrates example schemes 310 and 320 under schemes in accordance with implementations of the present disclosure. Schemes 310 and 320 involves a UE and a network node, which may be a part of a wireless communication network (e.g., an LTE network, an LTE-Advanced network, an LTE-Advanced Pro network, a 5G network, an NR network, an IoT network or an NB-IoT network). The network node may transmit a downlink signal to the UE. The UE may be configured to determine a first configuration to transmit an ACK in response to successful detection of the downlink signal. The UE may be configured to determine a second configuration to transmit a NACK in response to unsuccessful detection of the downlink signal. The UE may use different configurations to transmit the ACK and the NACK respectively on the PUCCH. The different configurations may comprise different resource blocks.

Specifically, the UE may be configured to use a first set of resource blocks to transmit the ACK (e.g., $N_{PUCCH}^{ACK}$). The UE may be configured to use a second set of resource blocks to transmit the NACK (e.g., $N_{PUCCH}^{NACK}$). In order to enhance the NACK-to-ACK probability, the second set of resource blocks may be set to be greater than the first set of resource blocks (e.g., $N_{PUCCH}^{NACK} > N_{PUCCH}^{ACK}$). In scheme 310, the second set of resource blocks may be determined by increasing extra resource blocks (e.g., $N_{PUCCH}^{Extr}$). For example, the second set of resource blocks may comprise more resource blocks in frequency domain than the first set of resource blocks. The total resource blocks for transmitting the NACK may be determined by $N_{PUCCH}^{NACK} = N_{PUCCH}^{ACK} + N_{PUCCH}^{Extr}$.

In scheme 320, the UE may be configured to use different resource blocks to transmit the NACK. For example, the second set of resource blocks may comprise different resource blocks in frequency domain and time domain compared to the first set of resource blocks. In addition, the size of the second set of resource blocks may be greater than the size of the first set of resource blocks. The second set of resource blocks may be pre-configured and/or dynamically configured by the network node. Accordingly, the UE may be able to transmit the NACK with more resource blocks. This may help the network node to detect the NACK more easily, and may reduce the NACK-to-ACK error rate.

Figure 4:
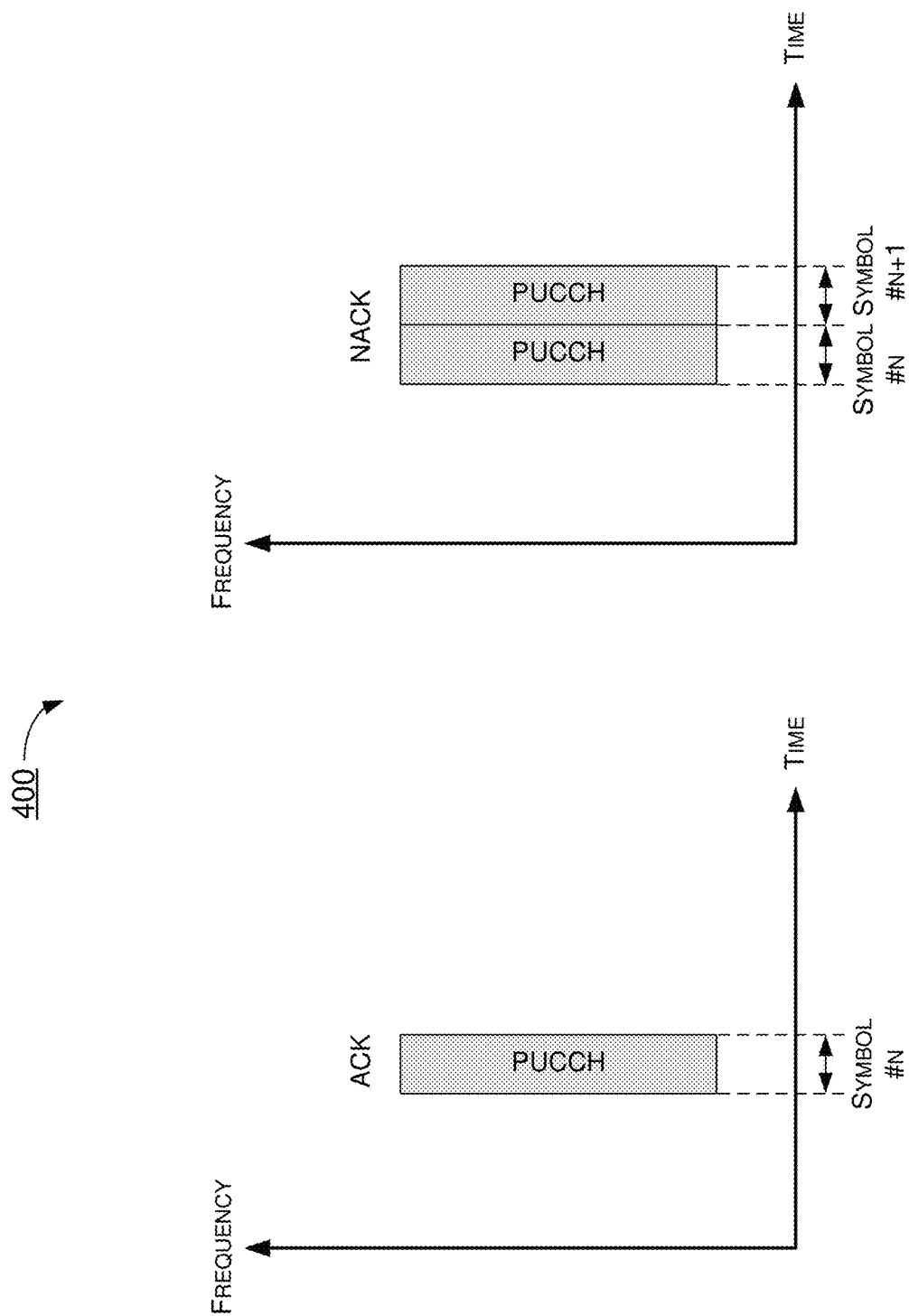
FIG. 4 is a diagram depicting an example scheme under schemes in accordance with implementations of the present disclosure.

FIG. 4 illustrates an example scheme 400 under schemes in accordance with implementations of the present disclosure. Scheme 400 involves a UE and a network node, which may be a part of a wireless communication network (e.g., an LTE network, an LTE-Advanced network, an LTE-Advanced Pro network, a 5G network, an NR network, an IoT network or an NB-IoT network). The network node may transmit a downlink signal to the UE. The UE may be configured to determine a first configuration to transmit an ACK in response to successful detection of the downlink signal. The UE may be configured to determine a second configuration to transmit a NACK in response to unsuccessful detection of the downlink signal. The UE may use different configurations to transmit the ACK and the NACK respectively on the PUCCH. The different configurations may comprise different transmission time intervals.

Specifically, the UE may be configured to use a first transmission time interval to transmit the ACK. The UE may be configured to use a second transmission time interval to transmit the NACK. In order to enhance the NACK-to-ACK probability, the second transmission time interval may be set to be greater than the first transmission time interval. The transmission time interval may comprise orthogonal frequency-division multiplexing (OFDM) symbols, slots, or mini-slots. For example, the UE may be configured to use one OFDM symbol (e.g., symbol # n) to transmit the ACK. The UE may be configured to use multiple OFDM symbols (e.g., symbol # n and symbol # n+1) to transmit the NACK. The UE may transmit the NACK repeatedly in the multiple OFDM symbols to increase the transmission robustness. The UE may transmit the NACK in contiguous OFDM symbols or non-contiguous OFDM symbols. Accordingly, the UE may be able to transmit the NACK with longer timer interval or more repetitions. This may help the network node to detect the NACK more easily, and may reduce the NACK-to-ACK error rate.

In some implementations, the different configurations may comprise different coding rates. The UE may be configured to use a first coding rate to transmit the ACK. The UE may be configured to use a second coding rate to transmit the NACK. In order to enhance the NACK-to-ACK probability, the second coding rate may be set to be better than (e.g., higher than or greater than) the first coding rate. For example, the second coding rate may have more protection bits than the first coding rate to better protect the NACK information. The NACK transmission may be more robust than the ACK transmission. This may reduce the detection error rate for the NACK at the receiver side.

In some implementations, the different configurations may comprise different transmission schemes. The UE may be configured to use a first transmission scheme to transmit the ACK. The UE may be configured to use a second transmission scheme to transmit the NACK. In order to enhance the NACK-to-ACK probability, the second transmission scheme may be set to be more robust than the first transmission scheme. For example, the UE may be configured to transmit the NACK by using a frequency hopping transmission. The NACK information may be transmitted in different frequency bands to increase the frequency diversity. Alternatively, the UE may be configured to transmit the NACK by using a multi-input multi-output (MIMO) transmission. The NACK information may be transmitted by multiple antennas to increase the spatial diversity.

In some implementations, the above mentioned schemes for transmitting the NACK information may be combined or cooperatively used to enhance the reliability. A subset of the possible schemes may be utilized as the default reliability enhancement scheme with the other schemes as fall back options if needed. For example, using the boosted transmission power level for transmitting the NACK may be utilized as the default scheme for reducing the NACK-to-ACK error rate. However, when the UE is configured to use its maximum transmission power to transmit the ACK, the power boost scheme for the NACK may not be a feasible option anymore. In such case, the UE may be further configured to use more resource blocks or more repetitions for the NACK transmission.

In some implementations, the above mentioned schemes for transmitting the NACK information may also be applicable when the PUCCH is multiplexed with other channels. For example, the PUCCH may be multiplex with the scheduling request or the physical uplink shared channel (PUSCH). In addition, the proposed schemes may also be applicable for other channels such as, for example and without limitation, PDCCH. Since the probability of transmitting the NACK is much lower than transmitting the ACK (e.g., 1% versus 99%), the use of the proposed schemes for improving the reliability may only cause small increase in device power consumption. The added inter-cell or intra-cell interferences may also be a small amount.

Illustrative Implementations

Figure 5:
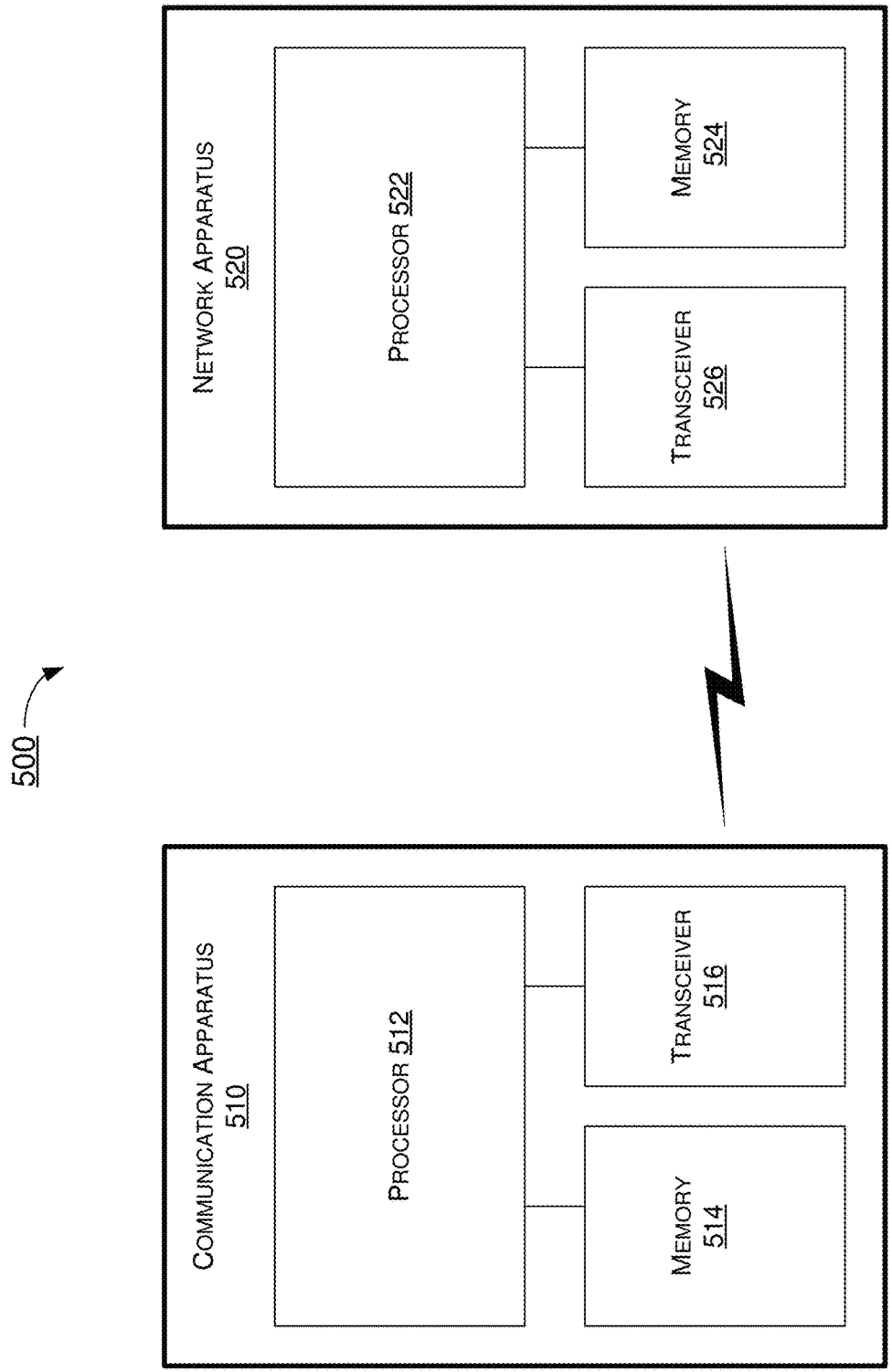
FIG. 5 is a block diagram of an example communication apparatus and an example network apparatus in accordance with an implementation of the present disclosure.

FIG. 5 illustrates an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to uplink control channel design for high reliability transmission with respect to user equipment and network apparatus in wireless communications, including schemes 200, 310, 320 and 400 described above as well as process 600 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT or NB-IoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, or one or more complex-instruction-set-computing (CISC) processors. Communication apparatus 510 may include at least some of those components shown in FIG. 5 such as a processor 512, for example. Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a transmit/receive point (TRP), a base station, a small cell, a router or a gateway. For instance, network apparatus 520 may be implemented in an eNodeB in an LTE, LTE-Advanced or LTE-Advanced Pro network or in a gNB in a 5G, NR, IoT or NB-IoT network. Alternatively, network apparatus 520 may be implemented in the form of one or more IC chips such as, for example and without limitation, one or more single-core processors, one or more multi-core processors, or one or more CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including power consumption reduction in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, network apparatus 520 may transmit a downlink signal to communication apparatus 510. Processor 512 may be configured to determine a first configuration to transmit an ACK in response to successful detection of the downlink signal. Processor 512 may be configured to determine a second configuration to transmit a NACK in response to unsuccessful detection of the downlink signal. Processor 512 may use different configurations to transmit the ACK and the NACK respectively (i.e., asymmetric ACK and NACK transmission) on the PUCCH.

In some implementations, processor 512 may be configured to use a first transmission power level to transmit the ACK (e.g., $P_{PUCCH}^{ACK}$). Processor 512 may be configured to use a second transmission power level to transmit the NACK (e.g., $P_{PUCCH}^{NACK}$). In order to enhance the NACK-to-ACK probability, the second transmission power level may be set to be greater than the first transmission power level (e.g., $P_{PUCCH}^{NACK} > P_{PUCCH}^{ACK}$). For example, processor 512 may determine the second transmission power level by increasing an offset power value (e.g., $\Delta_{NACK}$ dB) to the first transmission power level. Processor 512 may further consider the maximum allowable transmission power level on the uplink channel (e.g., $P_{CMAX}$). Accordingly, processor 512 may be configured to determine the final transmission power level for the NACK according to the following equation.

$$P_{PUCCH}^{NACK} = \min\{P_{CMAX}, P_{PUCCH}^{ACK} + \Delta_{NACK}\}$$

In some implementations, processor 512 may pre-configure and/or dynamically configure the offset power value. Alternatively, processor 512 may receive, via transceiver 516, the offset power value from network apparatus 520. Accordingly, processor 512 may be able to transmit the NACK with a higher power level. This may help network apparatus 520 to differentiate the NACK from the ACK, and may reduce the NACK-to-ACK error rate.

In some implementations, processor 512 may be configured to use a first set of resource blocks to transmit the ACK (e.g., $N_{PUCCH}^{ACK}$). Processor 512 may be configured to use a second set of resource blocks to transmit the NACK (e.g., $N_{PUCCH}^{NACK}$). In order to enhance the NACK-to-ACK probability, the second set of resource blocks may be set to be greater than the first set of resource blocks (e.g., $N_{PUCCH}^{NACK} > N_{PUCCH}^{ACK}$). Processor 512 may determine the second set of resource blocks by increasing extra resource blocks (e.g., $N_{PUCCH}^{Extr}$). For example, the second set of resource blocks may comprise more resource blocks in frequency domain than the first set of resource blocks. Processor 512 may determine the total resource blocks for transmitting the NACK by $N_{PUCCH}^{NACK} = N_{PUCCH}^{ACK} + N_{PUCCH}^{Extr}$.

In some implementations, processor 512 may be configured to use different resource blocks to transmit the NACK. For example, the second set of resource blocks may comprise different resource blocks in frequency domain and time domain compared to the first set of resource blocks. In addition, the size of the second set of resource blocks may be greater than the size of the first set of resource blocks. Processor 512 may receive, via transceiver 516, the second set of resource blocks from network apparatus 520. Accordingly, processor 512 may be able to transmit the NACK with more resource blocks. This may help network apparatus 520 to detect the NACK more easily, and may reduce the NACK-to-ACK error rate.

In some implementations, processor 512 may be configured to use a first transmission time interval to transmit the ACK. Processor 512 may be configured to use a second transmission time interval to transmit the NACK. In order to enhance the NACK-to-ACK probability, the second transmission time interval may be set to be greater than the first transmission time interval. For example, processor 512 may be configured to use one OFDM symbol to transmit the ACK. Processor 512 may be configured to use multiple OFDM symbols to transmit the NACK. Processor 512 may transmit the NACK repeatedly in the multiple OFDM symbols to increase the transmission robustness. Processor 512 may transmit the NACK in contiguous OFDM symbols or non-contiguous OFDM symbols. Accordingly, processor 512 may be able to transmit the NACK with longer timer interval or more repetitions. This may help network apparatus 520 to detect the NACK more easily, and may reduce the NACK-to-ACK error rate.

In some implementations, processor 512 may be configured to use a first coding rate to transmit the ACK. Processor 512 may be configured to use a second coding rate to transmit the NACK. In order to enhance the NACK-to-ACK probability, the second coding rate may be set to be better than (e.g., higher than or greater than) the first coding rate. For example, the second coding rate may have more protection bits than the first coding rate to better protect the NACK information. The NACK transmission may be more robust than the ACK transmission. This may reduce the detection error rate for the NACK at network apparatus 520.

In some implementations, processor 512 may be configured to use a first transmission scheme to transmit the ACK. Processor 512 may be configured to use a second transmission scheme to transmit the NACK. In order to enhance the NACK-to-ACK probability, the second transmission scheme may be set to be more robust than the first transmission scheme. For example, processor 512 may be configured to transmit the NACK by using a frequency hopping transmission. Processor 512 may transmit the NACK in different frequency bands to increase the frequency diversity. Alternatively, processor 512 may be configured to transmit the NACK by using MIMO transmission. Processor 512 may transmit the NACK by using multiple antennas to increase the spatial diversity.

In some implementations, processor 512 may combine or cooperative use the above mentioned schemes for transmitting the NACK to enhance the reliability. Processor 512 may utilize a subset of the possible schemes as the default reliability enhancement scheme with the other schemes as fall back options if needed. For example, processor 512 may utilize the boosted transmission power level for transmitting the NACK as the default scheme for reducing the NACK-to-ACK error rate. However, when processor 512 is configured to use its maximum transmission power to transmit the ACK, the power boost scheme for the NACK may not be a feasible option anymore. In such case, processor 512 may be further configured to use more resource blocks or more repetitions for the NACK transmission.

Illustrative Processes

Figure 6:
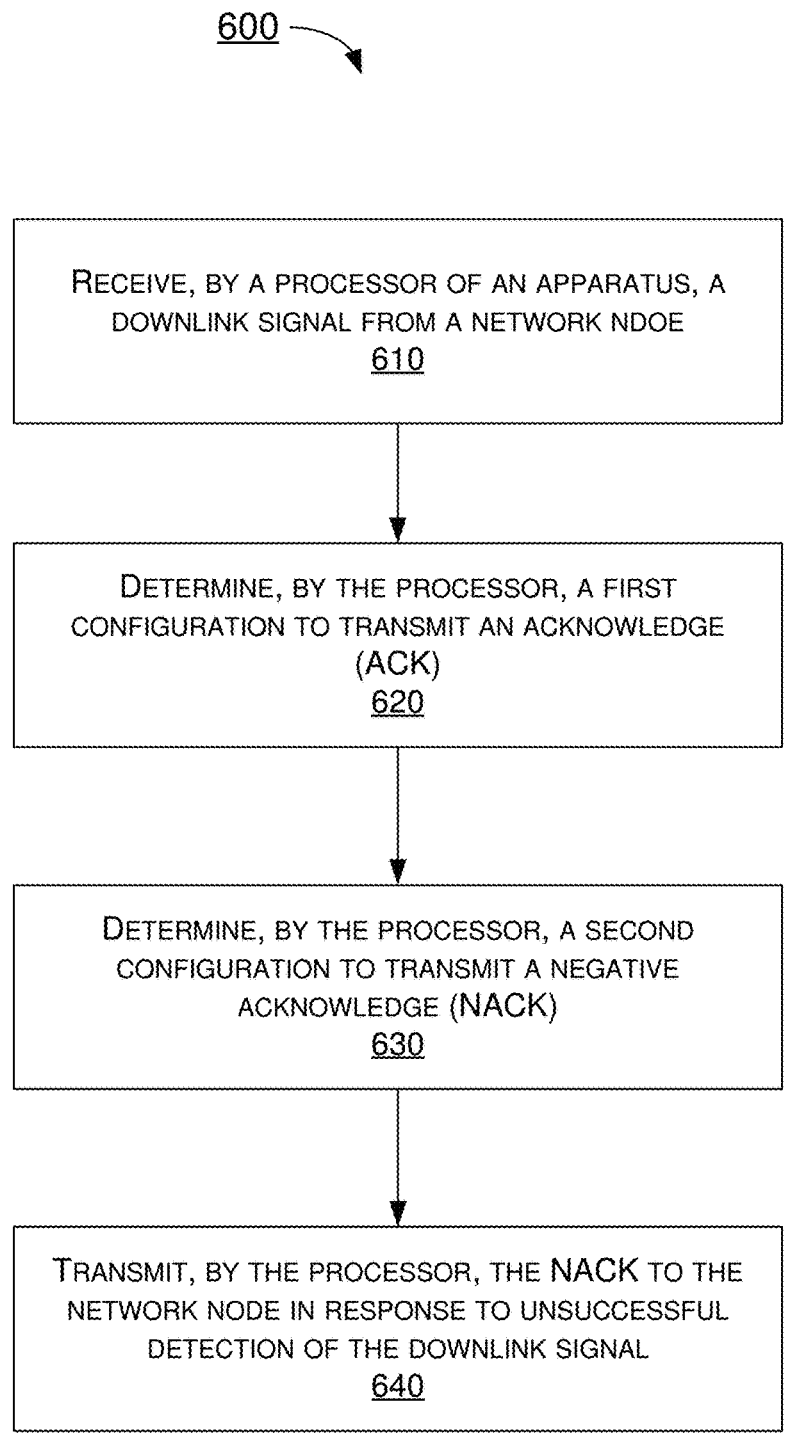
FIG. 6 is a flowchart of an example process in accordance with an implementation of the present disclosure.

FIG. 6 illustrates an example process 600 in accordance with an implementation of the present disclosure. Process 600 may be an example implementation of schemes 200, 310, 320 and 400, whether partially or completely, with respect to uplink control channel design for high reliability transmission in accordance with the present disclosure. Process 600 may represent an aspect of implementation of features of communication apparatus 510. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve processor 512 of apparatus 510 receiving a downlink signal from a network node. Process 600 may proceed from 610 to 620.

At 620, process 600 may involve processor 512 determining a first configuration to transmit an ACK. Process 600 may proceed from 620 to 630.

At 630, process 600 may involve processor 512 determining a second configuration to transmit a NACK. Process 600 may proceed from 630 to 640.

At 640, process 600 may involve processor 512 transmitting the NACK to the network node in response to unsuccessful detection of the downlink signal. The second configuration may be different from the first configuration.

In some implementations, the first configuration may comprise a first transmission power level. The second configuration may comprise a second transmission power level. The second transmission power level may be greater than the first transmission power level.

In some implementations, the first configuration may comprise a first set of resource blocks. The second configuration may comprise a second set of resource blocks. The second set of resource blocks may be greater than the first set of resource blocks.

In some implementations, the first configuration may comprise a first transmission time interval. The second configuration may comprise a second transmission time interval. The second transmission time interval may be greater than the first transmission time interval.

In some implementations, the first configuration may comprise a first coding rate. The second configuration may comprise a second coding rate. The second coding rate may be better than the first coding rate.

In some implementations, the second configuration may comprise transmitting the NACK repeatedly.

In some implementations, the second configuration may comprise transmitting the NACK by using frequency hopping transmission.

In some implementations, the second configuration may comprise transmitting the NACK by using MIMO transmission.

In some implementations, the downlink signal may comprise at least one of a downlink control signal and a downlink data signal (e.g., either or both of the downlink control signal and the downlink data signal). The NACK may be transmitted on a PUCCH.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, a downlink signal from a network node;
determining, by the processor, a first configuration to transmit an acknowledgement (ACK);
determining, by the processor, a second configuration to transmit a negative acknowledgement (NACK); and
transmitting, by the processor, the NACK to the network node in response to unsuccessful detection of the downlink signal,
wherein the second configuration is different from the first configuration,
wherein the transmitting of the NACK comprises applying the second configuration in transmitting the NACK in a hybrid automatic repeat request (HARQ) feedback when the HARQ feedback is transmitted on a physical uplink control channel (PUCCH),
wherein the first configuration comprises a first transmission power level, and
wherein the second configuration comprises a second transmission power level greater than the first transmission power level.

2. The method of claim 1, wherein the first configuration comprises a first set of resource blocks, wherein the second configuration comprises a second set of resource blocks, and wherein the second set of resource blocks is greater than the first set of resource blocks.

3. The method of claim 1, wherein the first configuration comprises a first transmission time interval, wherein the second configuration comprises a second transmission time interval, and wherein the second transmission time interval is greater than the first transmission time interval.

4. The method of claim 1, wherein the first configuration comprises a first coding rate, wherein the second configuration comprises a second coding rate, and wherein the second coding rate is greater than the first coding rate.

5. The method of claim 1, wherein the second configuration comprises transmitting the NACK repeatedly.

6. The method of claim 1, wherein the second configuration comprises transmitting the NACK by using a frequency hopping transmission.

7. The method of claim 1, wherein the second configuration comprises transmitting the NACK by using a multi-input multi-output (MIMO) transmission.

8. The method of claim 1, wherein the downlink signal comprises at least one of a downlink control signal and a downlink data signal.

9. The method of claim 1, wherein the NACK is transmitted on the PUCCH.

10. An apparatus, comprising:
a transceiver capable of wirelessly communicating with a plurality of nodes of a wireless network; and
a processor communicatively coupled to the transceiver, the processor capable of:
receiving, via the transceiver, a downlink signal from a network node;
determining a first configuration to transmit an acknowledgement (ACK);
determining a second configuration to transmit a negative acknowledgement (NACK); and
transmitting, via the transceiver, the NACK to the network node in response to unsuccessful detection of the downlink signal,
wherein the second configuration is different from the first configuration,
wherein in transmitting the NACK the processor applies the second configuration in transmitting the NACK in a hybrid automatic repeat request (HARQ) feedback when the HARQ feedback is transmitted on a physical uplink control channel (PUCCH),
wherein the first configuration comprises a first transmission power level, and
wherein the second configuration comprises a second transmission power level greater than the first transmission power level.

11. The apparatus of claim 10, wherein the first configuration comprises a first set of resource blocks, wherein the second configuration comprises a second set of resource blocks, and wherein the second set of resource blocks is greater than the first set of resource blocks.

12. The apparatus of claim 10, wherein the first configuration comprises a first transmission time interval, wherein the second configuration comprises a second transmission time interval, and wherein the second transmission time interval is greater than the first transmission time interval.

13. The apparatus of claim 10, wherein the first configuration comprises a first coding rate, wherein the second configuration comprises a second coding rate, and wherein the second coding rate is greater than the first coding rate.

14. The apparatus of claim 10, wherein the second configuration comprises transmitting the NACK repeatedly.

15. The apparatus of claim 10, wherein the second configuration comprises transmitting the NACK by using a frequency hopping transmission.

16. The apparatus of claim 10, wherein the second configuration comprises transmitting the NACK by using a multi-input multi-output (MIMO) transmission.

17. The apparatus of claim 10, wherein the downlink signal comprises at least one of a downlink control signal and a downlink data signal.

18. The apparatus of claim 10, wherein the NACK is transmitted on the PUCCH.

* * * * *